(12) United States Patent
Mann

(10) Patent No.: US 6,816,196 B1
(45) Date of Patent: Nov. 9, 2004

(54) CMOS IMAGER WITH QUANTIZED CORRELATED DOUBLE SAMPLING

(75) Inventor: Richard A. Mann, Torrance, CA (US)

(73) Assignee: ESS Technology, Inc., Fremont, CA (US)

( * ) Notice: Subject to any disclaimer, the term of this patent is extended or adjusted under 35 U.S.C. 154(b) by 682 days.

(21) Appl. No.: 09/885,433

(22) Filed: Jun. 18, 2001

(51) Int. Cl.[7] .............................................. H04N 5/217
(52) U.S. Cl. ...................................... 348/243; 348/241
(58) Field of Search ................................ 342/241, 243, 342/245, 308; 250/208.1; 327/91–96; 341/122–125

(56) References Cited

U.S. PATENT DOCUMENTS

| | | | | |
|---|---|---|---|---|
| 4,010,319 A | * | 3/1977 | Levine ........................ | 348/249 |
| 4,731,656 A | * | 3/1988 | Dischert et al. ............ | 348/249 |
| 5,086,344 A | * | 2/1992 | D'Luna et al. ............. | 348/250 |
| 5,926,214 A | * | 7/1999 | Denyer et al. .............. | 348/241 |
| 6,115,066 A | * | 9/2000 | Gowda et al. .............. | 348/308 |
| 6,750,906 B1 | * | 6/2004 | Itani et al. ................ | 348/229.1 |

* cited by examiner

Primary Examiner—Wendy R. Garber
Assistant Examiner—Timothy J. Henn
(74) Attorney, Agent, or Firm—Farjami & Farjami LLP

(57) ABSTRACT

A CMOS imager includes a CMOS image sensor comprising an array of photoreceptors, a memory storing a reference operating level for the array, and readout circuitry for obtaining, at n-bit resolution, a photoreceptor reset value from the photoreceptors in the array. In addition, the CMOS imager includes comparison circuitry that determines a difference between the reference operating level and the photoreceptor reset value as well as matching circuitry that matches the difference against bins in a bin allocation. In particular, the bin allocation spans a photoreceptor noise range with the bins forming a quantization of the noise range into correction levels. Each of the correction levels may be associated with an m-bit correction code, where m is typically much less than n. As a result, the amount of memory necessary to store the correction codes is far less than that required to store full resolution (i.e., n-bit) values. The CMOS imager thereby achieves reduced noise image extraction from a CMOS image sensor with less complexity, less memory and less expense than convention correlated double sampling implementations.

43 Claims, 4 Drawing Sheets

CMOS IMAGER WITH QUANTIZED CORRELATED DOUBLE SAMPLING

BACKGROUND OF THE INVENTION

1. Field of the Invention

This invention relates to electronic imaging devices, and in particular to a CMOS imager employing correlated double sampling to reduce noise.

2. Related Art

Electronic imaging devices ("imagers") find use in a broad range of applications in many distinct fields of technology including the consumer, industrial, medical, defense and scientific fields. Imagers use an array of photoreceptors to convert photons bearing image information into electrical signals representative of the image.

In recent years, CMOS image sensors have become a practical implementation option for imagers and provide cost and power advantages over other technologies such as charge coupled devices (CCD). A conventional CMOS image sensor is typically structured as an array of photoreceptors, each of which is approximately reset to a known potential after the readout of an image. However, the performance of a CMOS image sensor suffers from both fixed pattern noise (i.e., noise that tends to be the same for each readout, such as amplifier DC offset) and temporal noise (i.e., noise that varying or random, such as the noise associated with resetting the photoreceptors). Both types of noise undesirably distort the image obtained by the CMOS image sensor.

Correlated double sampling has provided one technique for addressing fixed pattern and temporal noise in a CMOS image sensor. With correlated double sampling, the imager reads and stores the charge level on each photoreceptor in the CMOS image sensor immediately after reset. At the end of an exposure period (i.e., after an integration period), each photoreceptor is read again, and the original charge level is subtracted from the final charge level. In this manner, image distorting offsets associated with fixed pattern noise and pixel reset temporal noise can be cancelled.

However, as CMOS image sensors grow in size, so do the memory requirements for performing correlated double sampling. The memory requirements are exacerbated by the use of high performance A/D converters, which may provide output resolution of 8, 10, or more bits. Thus, for example, at 10 bit resolution, a 1024×1024 photoreceptor CMOS image sensor requires 10,485,760 bits or 1.25 MBytes of memory to store the charge values of the photoreceptors immediately after reset. Extensive memory requirements increase the cost and complexity of CMOS imagers that incorporate CMOS image sensors.

A need exists for an improved CMOS imager that addresses the problems noted above and other previously experienced.

SUMMARY

An improved CMOS imager is arrived at by implementing quantized correlated double sampling in conjunction with a CMOS image sensor. The CMOS imager may be broadly conceptualized as an imager that achieves reduced noise image extraction from a CMOS image sensor with less complexity, less memory and less expense than convention correlated double sampling implementations.

There is an uncertainty in the starting value of each photoreceptor at the beginning of integration that is caused by noise in the process that resets the photoreceptor to an initial voltage. The reset noise is reduced to a much smaller level by reading the photoreceptor immediately after reset and saving the initial voltage as a stored representation in memory. In addition, an approximate correction is then applied to the stored representation after readout of the photoreceptor after the integration period. The correction is designed to reduce the contribution of reset noise until the dominant noise source in the final image is temporal noise from readout electronics.

For example, one implementation of the CMOS imager includes a CMOS image sensor comprising an array of photoreceptors, a memory storing a reference operating level for the array, and readout circuitry for obtaining, at n-bit resolution, a photoreceptor reset value from the photoreceptors in the array. The CMOS imager also includes comparison circuitry that determines a matched bin based on the reference operating level and the photoreceptor reset value. The matched bin is one of several noise bins, each with an assigned correction level, that quantizes a photoreceptor noise range.

Each of the noise bins (and thus the correction levels) is associated with an m-bit correction code, where m is typically much less than n. Thus, for example, n may be 10 and m may be 3 or 4. One result is that the amount of memory necessary to store a correction code for each photoreceptor is far less than that required to store full resolution (i.e., n-bit) photoreceptor reset values required by conventional correlated double sampling. As will be explained in detail below, complexity and cost benefits result.

Other implementations, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principals of the invention. Moreover, in the figures, like reference numerals designate corresponding parts throughout the different views.

DETAILED DESCRIPTION OF THE PREFERRED EMBODIMENTS

Figure 1:
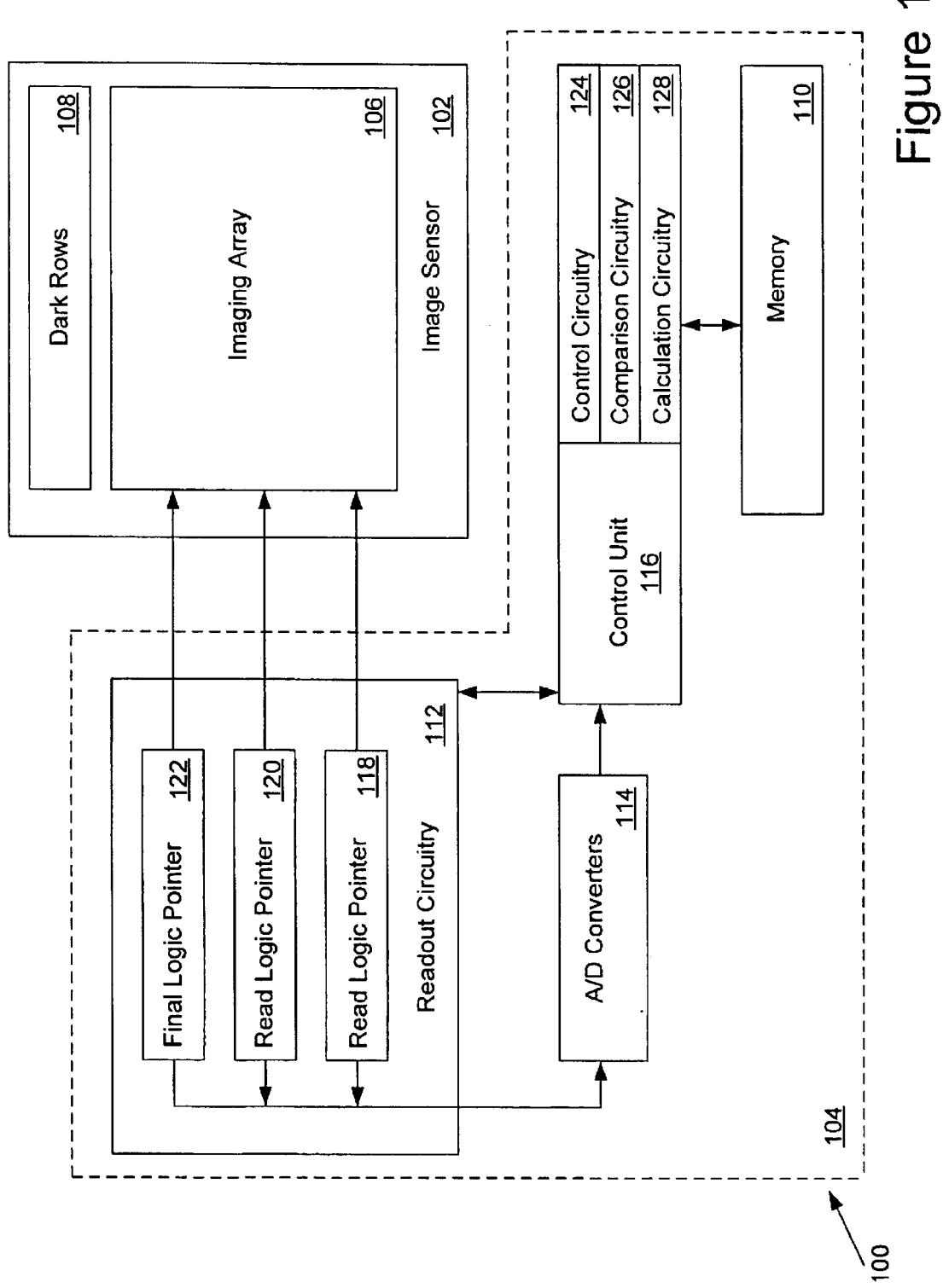
FIG. 1 shows a CMOS imager incorporating a quantized correlated double sampler.

With regard first to FIG. 1, that figure illustrates a CMOS imager 100 that includes a CMOS image sensor 102 coupled to a quantized correlated double sampler 104 ("double sampler 104"). The CMOS image sensor 102 includes an array of photoreceptors including an imaging array 106 and optional dark rows 108. The double sampler 104 includes a memory 110, readout circuitry 112, and A/D converters 114. A control unit 116 coordinates the operation of the double sampler 104, as will be described in more detail below. All of the elements in FIG. 1 may be built using one or more silicon devices. For example, the memory 110 and control unit 116 may reside in a digital camera control chip while the remaining elements may reside in an image sensor chip.

The imaging array 106 provides photoreceptors that respond to incident light. The dark rows 108, however, provide photoreceptors that are covered or masked to prevent exposure to light. The dark rows 108 (dark columns are also suitable) provide reference information as explained below. There may be, for example, ten dark rows 108 and 1–2000 rows of photoreceptors in the imaging array 106.

The readout circuitry 112 connects photoreceptors in the CMOS image sensor 102 to the A/D converters 114. To that end, and as an example, the readout circuitry 112 may include a reset logic pointer 118, a read logic pointer 120, and a final logic pointer 122. The reset logic pointer selects (e.g., by providing reset control signals) a photoreceptor in the CMOS image sensor 102 to be reset to a known state in preparation for the next image exposure. The read logic pointer 120 selects (e.g., by providing read control signals) a photoreceptor in the CMOS image sensor 102 for readout immediately after reset. Similarly, the final read logic pointer 122 selects (e.g., by providing read control signals) a photoreceptor in the CMOS image sensor 102 for readout after an integration period (i.e., after exposure to light for a selected time period).

The A/D converters 114 convert photoreceptor charge levels with n-bits of resolution. In one implementation, the A/D converters 114 may be 10-bit A/D converters and thereby provide a digital output that is a 10-bit representation of photoreceptor charge level. Other resolutions (e.g., 8-bit resolution) are also suitable depending on the application, however.

The memory 110 provides general purpose storage for the CMOS imager 100. For example, a portion of the memory 110 may be allocated as a frame memory that stores photoreceptor charge levels and image frames before, during, and after processing, a reference memory for storing reference operating levels, and parameter memory for storing bin allocations, noise range quantizations, and other variables (as explained below). The memory 110 may be incorporated on the same die with the remainder of the CMOS imager 100, or it may be included separately as part of a CMOS imager system (e.g., in a digital camera). Furthermore, the memory 110 need not be implemented as a single block of memory. Rather, one or more separate memories (either on-die or off-die) may be included to provide frame memory, parameter memory, reference memory, and the like.

In one implementation, the control unit 116 includes control circuitry 124, comparison circuitry 126, and calculation circuitry 128. The control unit 116 may be implemented with custom discrete logic, standard processor cores, or the like. The control circuitry 124, in general, controls the flow of data from the A/D converters 114 to and from the memory 110, coordinates resetting the photoreceptors in the CMOS imager sensor 102, and controls the timing for photoreceptor readout after reset, and after a selected integration time.

In operation, the control circuitry 124 may dynamically establish a quantization of a photoreceptor noise range using noise bins with assigned correction levels and correction codes. To that end, the control circuitry 124 reads each dark row 108 immediately after reset, and stores the average photoreceptor reset value, M, of each row in the memory 110. In addition, the calculation circuitry 128 may then determine a statistical measure of the photoreceptor reset values in the dark rows 108 (e.g., standard deviation), determine a photoreceptor noise range from the statistical measure (e.g., plus/minus 3 standard deviations), allocate 'm' noise bins to quantize the photoreceptor noise range (e.g., by equally distributing 16 noise bins across the photoreceptor noise range), and assign and store correction levels and correction codes for each noise bin in the memory 110. Optionally, the quantization may be preprogrammed or preset based on initial device characterizations, and the like. Examples of quantization of a photoreceptor noise range are provided below and shown in FIGS. 2 and 3.

Figure 2:
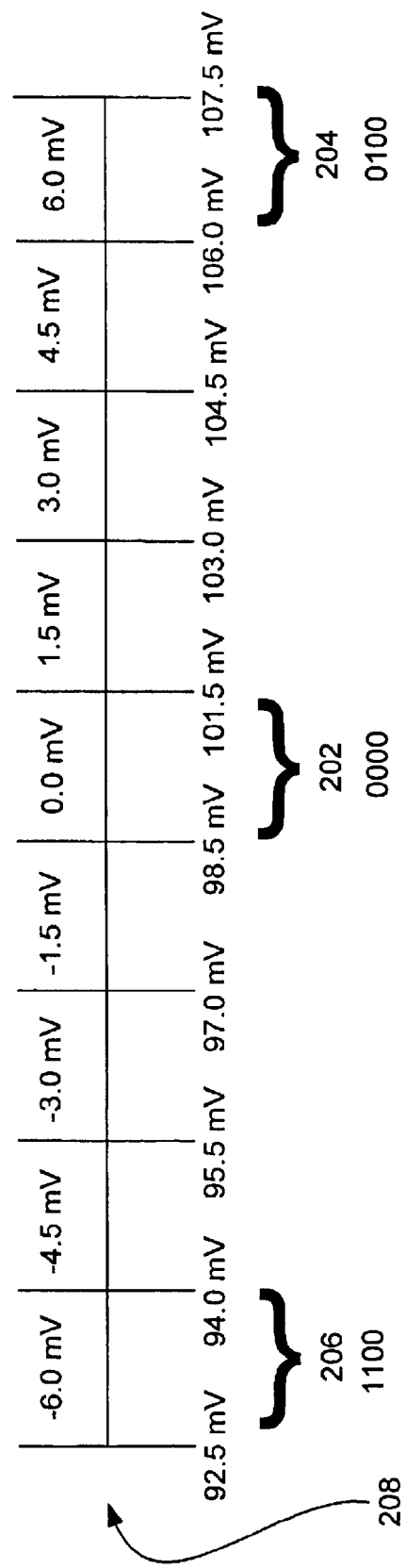
FIG. 2 shows a first bin allocation that spans a photoreceptor noise range.

With regard to FIG. 2, that figure shows a bin allocation 200 of noise bins that quantize a photoreceptor noise range. In other words, the photoreceptor noise range is divided into discrete steps. The number of noise bins, m, is preferably less than $2^n$, where n is the full resolution of the A/D converters 114 (e.g., 10 bits) used to digitize photoreceptor charge levels. Thus, the number of bits needed to assign a code to each bin is typically much less than the number of bits needed to represent a full resolution value. Three noise bins are labeled 202, 204, and 206, and the photoreceptor noise range is labeled 208. The noise bin 202 is assigned the correction code 0000, the noise bin 204 is assigned the correction code 0100, and the noise bin 206 is assigned the correction code 1100.

The photoreceptor noise range 208 is centered around a reference operating level (100 mV), and extends approximately 7.5 mV in either direction. To obtain the reference operating level, the control circuitry 124 preferably waits an integration time, then reads photoreceptors charge levels from the dark rows 108. The calculation circuitry 128 then averages the photoreceptor charge levels to obtain the reference operating level (which, due to the averaging process, is relatively free of temporal noise). To that end, the number of photoreceptors from the dark rows 108 that contribute to the average is preferably greater than 100, although more or fewer photoreceptors may be used depending on a statistical characterization of the photoreceptors that provides acceptably low noise content for a particular application.

As illustrated in FIG. 2, the noise bin 202 spans 3 mv of noise, while the remaining noise bins, including noise bins 204, 206 span 1.5 mV of noise. Preferably, the noise bins quantize the photoreceptor noise range 208 to eliminate fixed pattern and temporal noise to approximately the level of a statistical noise property of the readout circuitry 112. For example, the noise bins may quantize the photoreceptor noise range 208 to provide corrections that eliminate fixed pattern and temporal noise to at least 3 standard deviations (i.e., three-sigma) of the noise characteristics of the readout circuitry 112. Assuming that the readout circuitry 112 is associated with a one-sigma standard deviation noise floor of 10 electrons (or 0.5 mV), then the three-sigma noise is 1.5 mV. Thus, the quantization of the photoreceptor noise range 208 provides fixed pattern and temporal noise correction to at least 1.5 mV.

As explained above, the extent of the photoreceptor noise range itself is preferably selected according to noise statistics associated with the photoreceptors in the CMOS image sensor 102. As an example, photoreceptors associated with 3.2 fF of capacitance produce a response of approximately 50 microvolts for one collected photoelectron. Assuming that the standard deviation (i.e., one-sigma) reset voltage noise is 30 electrons, then 99% of the time, the rest voltage varies between plus/minus 4.5 mV due to temporal reset noise.

Fixed pattern noise may be determined through CMOS image sensor 102 characterization measurements. Assume, as an example, that the standard deviation (one-sigma) fixed pattern noise is approximately plus/minus 1.8 mV. Adding, in quadrature, the one-sigma temporal and fixed pattern noise yields: $((1.5)(1.5)+(1.8)(1.8))^{\wedge}(0.5)$ or approximately plus/minus 2.3 mV. Thus, the total variation in the photoreceptor charge level when read immediately after reset is approximately three-sigma (3*2.4 mV) or approximately plus/minus 7 mV.

However, the readout circuitry 112 contributes readout noise as well. As an example, if the standard deviation (one-sigma) of the readout noise floor is 10 electrons (0.5 mV), then 99% of the time, the readout noise contributes between plus/minus 1.5 mV of noise. Thus, one aspect of correlated quantized double sampling is to reduce the total photoreceptor readout noise to less than 1.5 mV (i.e., to the point where the remaining noise can be attributed primarily to the readout circuitry 112 or the fixed pattern and temporal noise). In this example, the photoreceptor noise range preferably compensates for 2*7 mV–1.5 mV or approximately 12.5 mV of noise in 1.5 mV steps. In other words, and referring again to FIG. 2, the noise bins provide correction levels that reduce photoreceptor readout noise below 1.5 mV using noise bins that quantize the photoreceptor noise range 208 into 1.5 mV steps (except for the first noise bin 202).

In FIG. 2, nine noise bins span the photoreceptor noise range 208. As a result, no more than 4 bits are required to provide correction codes for the noise bins. The correction codes are stored in the memory 110 rather than a full n-bit resolution correction level, thereby directly reducing the memory requirements for implementing correlated double sampling.

Each noise bin is assigned a correction level. As examples, the noise bin 202 is assigned a correction level of 0.0 mV, the noise bin 204 is assigned a correction level of 6.0 mV, and the noise bin 206 is assigned a correction level of −6.0 mV. After resetting the imaging array 106, the CMOS imager 100 determines correction codes for each photoreceptor based on photoreceptor reset values. Assume, for example that the CMOS imager 100 obtains a photoreceptor reset value of 106.5 mV. That CMOS imager determines that the matched bin for that reset value is noise bin 204, and stores the correction code 0100 in memory for that photoreceptor. In other words, the photoreceptor, during this reset iteration, suffers from total noise, including fixed pattern and temporal noise of approximately 6.5 mV.

Figure 3:
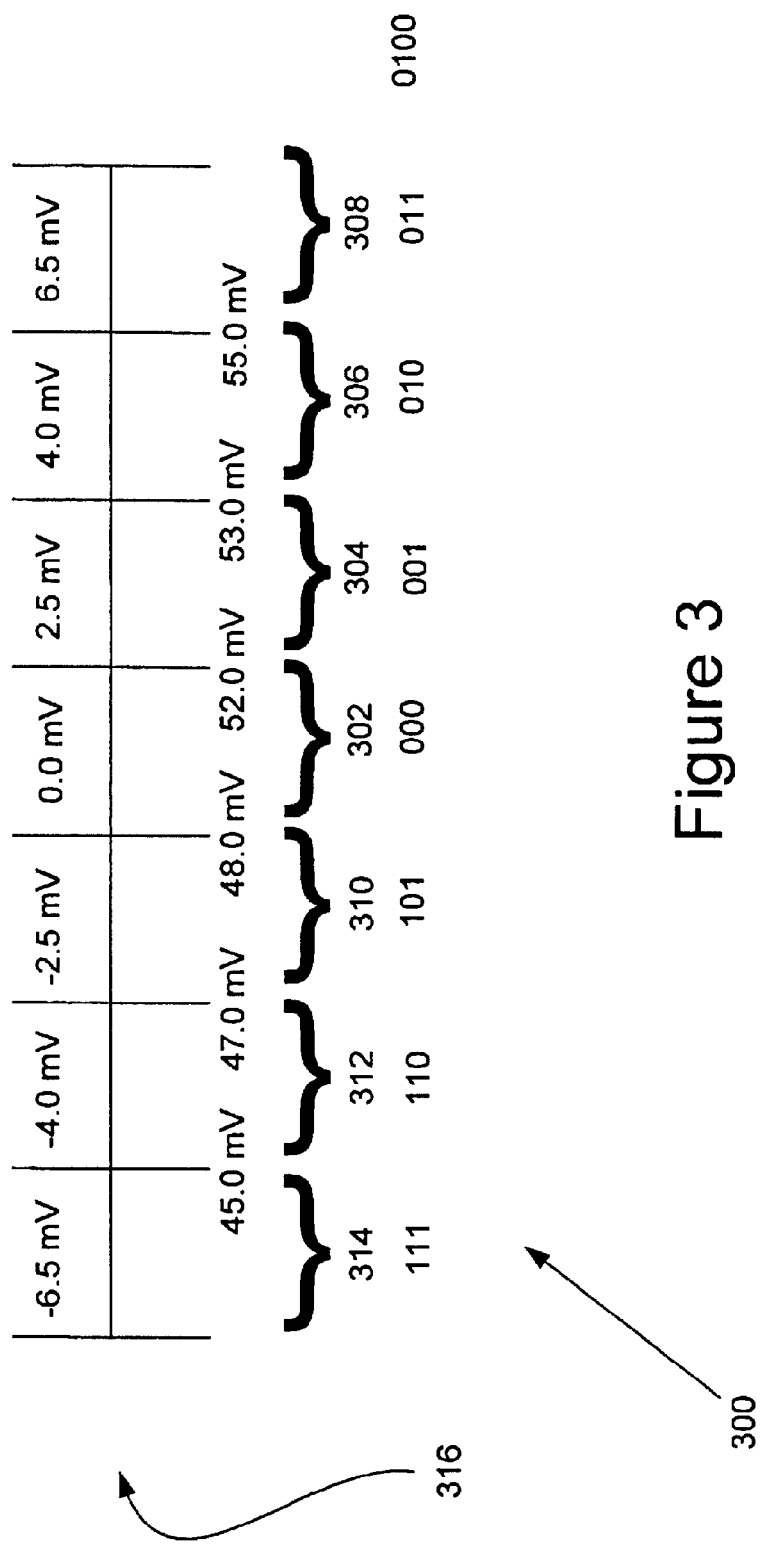
FIG. 3 shows a second bin allocation that spans a photoreceptor noise range.

Note that the noise bins need not be equal in extent, nor adhere to a particular relationship with regard to their assigned correction levels. Turning to FIG. 3, for instance, a second bin allocation 300 is illustrated. The bin allocation 300 includes the seven noise bins 302–314 with associated correction codes 000–111 that quantize the photoreceptor noise range 316.

The noise bin 302 provides a 0.0 mv correction level (code 000) for photoreceptor reset value within 2 mV of the reference operating level. The noise bins 304 and 310 provide plus/minus 2.5 mV correction levels (codes 001 and 101) for photoreceptor reset values within 2–3 mV of the reference operating level. The noise bins 306 and 312 provide plus/minus 4.0 mV correction levels (codes 010 and 110) for photoreceptor reset values within 3–5 mV of the reference operating level. The noise bins 308 and 314 provide plus/minus 6.5 mV correction levels (codes 011 and 111) for photoreceptor reset values more than plus/minus 5 mV of the reference operating level.

Once a bin allocation is in place, and immediately after resetting the CMOS image sensor 102, the control circuitry 124 reads photoreceptor reset values from photoreceptors in the imaging array 106. The comparison circuitry 126 determines a matched bin for each photoreceptor based on the reference operating level and the photoreceptor reset values. The control unit 116 then stores the correction code associated with each matched bin in the memory 110.

After the integration time has elapsed, the control circuitry reads photoreceptor output values from each row in the imaging array 106. The calculation circuitry 128 determines a corrected photoreceptor output value by subtracting the reference operating level, and the correction level corresponding to the correction code for the bin to which the photoreceptor belongs. The control circuitry 124 stores the corrected photoreceptors output values at full n-bit resolution in the memory 110.

Figure 4:
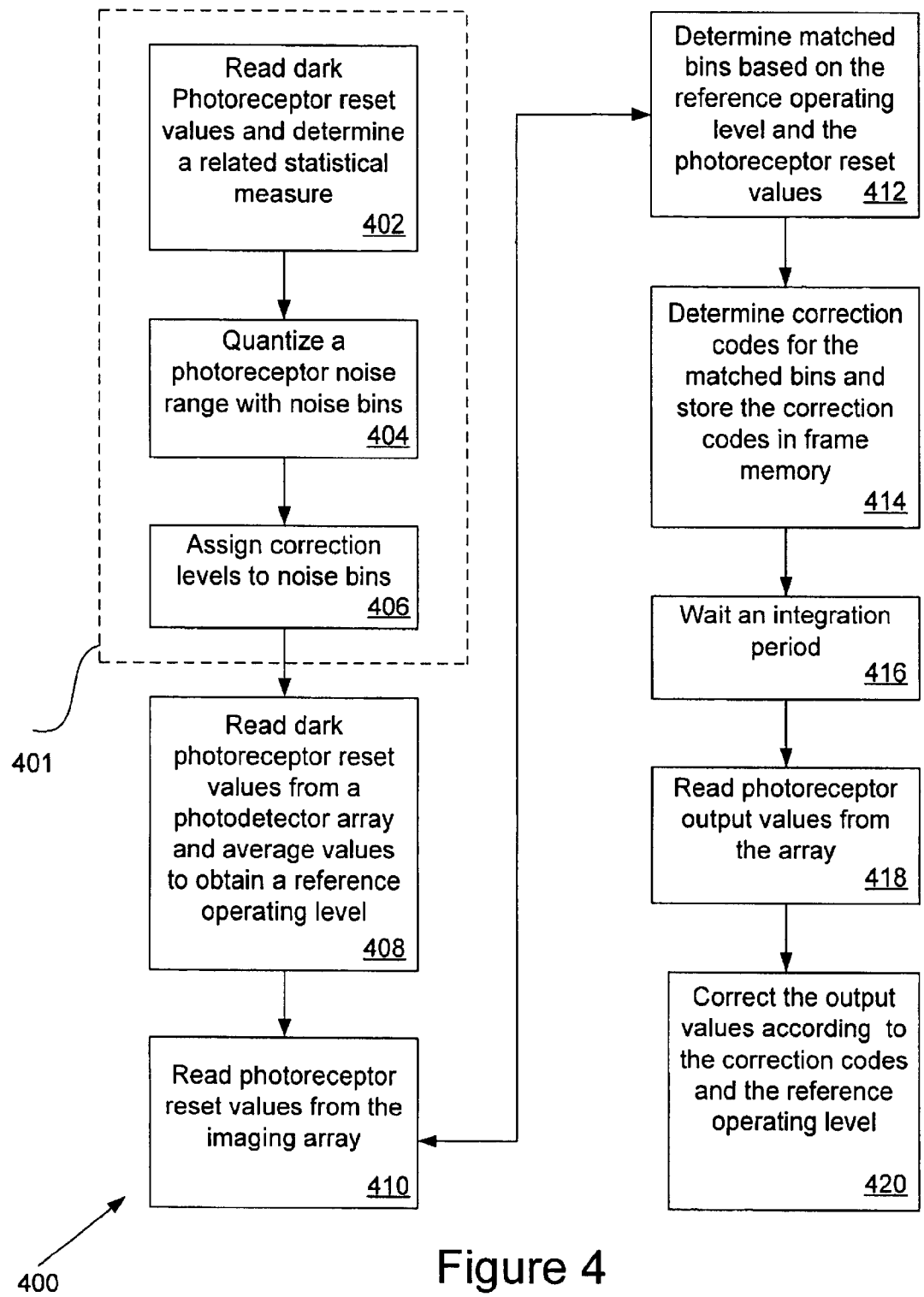
FIG. 4 shows a method for quantized correlated double sampling.

Turning next to FIG. 4, that figure illustrates a method 400 for quantized correlated double sampling. The initialization steps indicated by reference numeral 401 occur, for example, upon CMOS imager 100 initialization, or when commanded by the control unit 106. Specifically, the control circuitry 124 reads dark row photoreceptor reset values immediately after reset, and the calculation circuitry 128 determines a related statistical measure (e.g., standard deviation) (402). The calculation circuitry 128 then determines a photoreceptor noise range (e.g., plus/minus three standard deviations), and quantizes the photoreceptor noise range (404) using noise bins. In addition, the calculation circuitry 128 assigns (406) correction levels to the noise bins.

In other words, the photoreceptor noise range need not remain the same over time. Rather, it may dynamically change based on periodic reevaluations of the photoreceptor reset values. With changes in the photoreceptor noise range may also come changes in the quantization of the photoreceptor noise range, the number of noise bins, the extent of the noise bins, their correction codes and correction levels. To that end, the memory 110 may store an updateable representation of the quantization of the photoreceptor noise range.

In operation, the control unit 116 reads (408) photoreceptor reset values from dark photoreceptors. The dark photoreceptors may be, for example, dark row or column photoreceptors. As explained above, the photoreceptor reset values are preferably averaged to obtain a reference operating level. Note that step 408 may be merged with step 402, for example when the initialization steps 401 are performed.

Next, the CMOS imager reads (410) photoreceptor reset values from the imaging array 106 and determines (412) matched bins in the bin allocation based on the reference operating level and the photoreceptor reset values. In this manner, the CMOS imager 100 determines (414) correction codes for the matched bins and stores the correction codes in the memory 110. Each photoreceptor in the portion of the imaging array 106 that will be used to capture an image is preferably assigned a correction code that is stored in the memory 110 in a unique location.

During imaging, the CMOS imager first waits (416) for a suitable exposure time (i.e., an integration period). The CMOS imager then reads (418) photoreceptor output values from the imaging array 106. The CMOS imager corrects (420) the photoreceptor output values based on the correction codes and the reference operating level. For example, referring again to FIG. 2, assuming a reference operating level of 100 mV, a correction code of 0100, and a photoreceptor output value of 500 mV, the corrected photoreceptor output value may be determined as 500 mV−100 mV−6.0 mv=394 mV. The corrected photoreceptor output value has been compensated for temporal and fixed pattern noise.

As a result, the CMOS imager 100 reduces noise in an image, and therefore improves image quality. Furthermore, the CMOS imager 100, using the quantized correlated double sampler 104, produces an improved image using less memory than ordinarily required for correlated double sampling. As an example, at 10-bit resolution, a 1024×1024 photoreceptor CMOS image sensor, using 4-bit correction codes, uses only 4,14,304 bits or 524 K bytes of memory to perform quantized correlated double sampling. Thus, the memory 110 may be shared, for example, by storing both the short correction codes, and the full resolution corrected photoreceptor output values. In other words, control circuitry 124 may store the correction codes in the memory 110 starting a an offset that results in corrected photoreceptor output values overwriting already used (and no longer needed) correction codes. Alternatively, the correction codes may be stored in a separate area of memory and used for multiple imaging operations.

While various embodiments of the application have been described, it will be apparent to those of ordinary skill in the art that many more embodiments and implementations (e.g., using a different form or representation of quantization of the photoreceptor noise range) are possible that are within the scope of this invention. Accordingly, the invention is not to be restricted except in light of the attached claims and their equivalents.

What is claimed is:

1. A method for quantized correlated double sampling in an imager digitizing photoreceptor charge levels at n-bit resolution, the method comprising:

assigning, correction levels to noise bins quantizing a photoreceptor noise range, the noise bins being fewer in number than $2^n$;

establishing a reference operating level;

reading a photoreceptor reset value from a photoreceptor;

determining a matched bin based on the reference operating level and the photoreceptor reset value; and generating a corrected photoreceptor output value according to the matched bin.

2. A method according to claim 1, wherein establishing a reference operating level comprises averaging a predetermined number of photoreceptor reset values.

3. A method according to claim 2, wherein averaging comprises averaging a predetermined number of dark photoreceptor reset values.

4. A method according to claim 2, further comprising quantizing the reset values with an A/D converter at a reduced precision in comparison to a full precision attainable with the A/D converter.

5. A method according to claim 4, wherein the reduced precision is 6–8 bits.

6. A method according to claim 1, wherein determining a matched bin further comprises determining a correction code for the matched bin.

7. A method according to claim 6, further comprising storing the correction code in a memory.

8. A method according to claim 7, further comprising storing correction codes in memory for each photoreceptor in an image sensor.

9. A method according to claim 8, wherein storing comprises storing correction codes in a frame buffer that is also used to store the corrected photoreceptor values.

10. A method according to claim 1, further comprising:

waiting an integration period; and reading a photoreceptor output value.

11. A method according to claim 10, wherein generating comprises correcting the photoreceptor output value according to a correction code for the matched bin and the reference operating level.

12. A method according to claim 2, further comprising obtaining the photoreceptor noise range based on selected ones of the photoreceptor reset values.

13. A method according to claim 12, wherein obtaining comprises obtaining the photoreceptor noise range based on a standard deviation of selected ones of the photoreceptor reset values.

14. A method according to claim 13, wherein obtaining comprises obtaining the photoreceptor noise range as approximately 3 times the standard deviation.

15. A method according to claim 1, wherein the quantization is into sixteen or fewer noise bins.

16. A method according to claim 1, wherein the quantization is into eight or fewer noise bins.

17. A CMOS imager digitizing photoreceptor charge levels at n-bit resolution, the CMOS imager comprising:

a CMOS image sensor comprising an array of photoreceptors;

a memory storing a reference operating level for the array;

readout circuitry for obtaining a photoreceptor reset value;

comparison circuitry that determines a matched bin based on the reference operating level and the photoreceptor reset value, the matched bin one of a plurality of noise bins quantizing a photoreceptor noise range, the noise bins being fewer in number than $2^n$.

18. A CMOS imager according to claim 17, further comprising a memory for storing a correction level assigned to the matched bin.

19. A CMOS imager according to claim 17, further comprising a memory for storing a correction code assigned to the matched bin.

20. A CMOS imager according to claim 18, wherein the memory is a frame buffer for storing individual correction levels for each photoreceptor in the array and for storing corrected photoreceptor output values, wherein the individual correction levels are stored prior to the corrected photoreceptor output values.

21. A CMOS imager according to claim 17, wherein the photoreceptor noise range is quantized into equal parts.

22. A CMOS imager according to claim 17, wherein the photoreceptor noise range is quantized into unequal parts with greater precision nearer the reference operating level.

23. A CMOS imager according to claim 17, further comprising noise estimation circuitry for obtaining the photoreceptor noise range.

24. The CMOS imager according to claim 23, wherein the noise estimation circuitry is standard deviation estimation circuitry.

25. The CMOS imager according to claim 17, wherein the reference operating level is an average of a predetermined number of photoreceptor reset values.

26. The CMOS imager according to claim 25, wherein the array comprises dark photoreceptors and an active photoreceptor array and the photoreceptor reset values are dark photoreceptor reset values.

27. The CMOS imager according to claim 17, wherein the photoreceptor noise range includes a fixed pattern component and a temporal component.

28. The CMOS imager according to claim 17, further comprising calculation circuitry for generating a corrected photoreceptor output value according to the matched bin.

29. A CMOS imager digitizing photoreceptor charge levels at n-bit resolution, the imager comprising:

means for establishing a reference operating level;

means for reading a photoreceptor reset value from a photoreceptor;

means for determining a matched bin based on the reference operating level and the photoreceptor reset value, the matched bin one of a plurality of noise bins quantizing a photoreceptor noise range, the noise bins being fewer in number than $2^n$.

30. A CMOS imager to claim 29, wherein the reference operating level comprises an average of a predetermined number of photoreceptor reset values.

31. A CMOS imager according to claim 30, wherein the reference operating level comprises an average of a predetermined number of dark photoreceptor reset values.

32. A CMOS imager according to claim 29, wherein the means for determining determines a correction code for the matched bin.

33. A CMOS imager according to claim 32, further comprising means for storing correction codes in memory for each photoreceptor in an image sensor.

34. A CMOS imager according to claim 33, further comprising:

means for reading a photoreceptor output value after an integration period; and means for generating a corrected photoreceptor output value according to the matched bin.

35. A CMOS imager according to claim 29, further comprising means for obtaining the photoreceptor noise range based on a statistical property of selected ones of the photoreceptor reset values.

36. A CMOS imager according to claim 35, wherein the statistical property is standard deviation.

37. A quantized correlated double sampler comprising:

a reference memory storing a reference operating level;

readout circuitry for obtaining, at n-bit resolution, a photoreceptor reset value, and, after an integration period, a photoreceptor output value;

comparison circuitry that determines a matched bin based on the reference operating level and the photoreceptor reset value; the matched bin one of a plurality of noise bins quantizing a photoreceptor noise range, the noise bins being fewer in number than $2^n$; and calculation circuitry for obtaining a corrected photoreceptor output value by compensating the photoreceptor output value in accordance with the matched bin.

38. A quantized correlated double sampler according to claim 37, further comprising averaging circuitry coupled to the memory, and wherein the reference operating level comprises an average of a predetermined number of photoreceptor reset values.

39. A quantized correlated double sampler according to claim 38, wherein the reference operating level comprises an average of a predetermined number of dark photoreceptor reset values.

40. A quantized correlated double sampler according to claim 37, wherein each noise bin is assigned a correction code.

41. A quantized correlated double sampler according to claim 40, further comprising a memory for storing correction codes for each photoreceptor in an image sensor.

42. A quantized correlated double sampler according to claim 37, further comprising a frame memory for storing corrected photoreceptor output values.

43. A quantized correlated double sampler according to claim 42, wherein the frame memory stores correction codes for matched bins prior to storing the corrected photoreceptor output values.

* * * * *